United States Patent Office 2,899,270
Patented Aug. 11, 1959

2,899,270

PRODUCTION OF THORIUM FLUORIDE

William H. Zachariasen, Chicago, Ill., assignor to the United States of America as represented by the United States Atomic Energy Commission No Drawing. Application November 25, 1952
Serial No. 322,551

1 Claim. (Cl. 23—14.5)

This invention deals with the production of thorium fluoride, and in particular with the production of anhydrous thorium fluoride from aqueous solutions.

Anhydrous thorium fluoride has been prepared heretofore by reacting gaseous hydrogen fluoride with thorium dioxide at elevated temperature. For this process the thorium dioxide had to be present in finely divided form, which mostly involved a preliminary grinding step. Moreover, the reaction with the gaseous hydrogen fluoride proceeded relatively slowly, and the yield in a certain unit of time was not very satisfactory. It has also been tried to produce thorium fluoride from aqueous solutions; however, in all instances a hydrated product was obtained. Dehydration of this hydrated thorium fluoride by heating was found to be highly satisfactory because hydrolysis always took place, and the product was an amorphous material which was contaminated by greater or lesser quantities of thorium oxide or thorium hydroxide. Thorium fluoride in the anhydrous condition is necessary for a great many uses, for instance for the production of thorium metal.

It is an object of this invention to provide a process of producing anhydrous thorium fluoride in the form of crystalline particles.

It is another object of this invention to provide a process of producing anhydrous thorium fluoride which is simple and economical.

These and other objects are accomplished by reacting a concentrated aqueous solution of thorium nitrate and a concentrated aqueous solution of hydrofluoric acid at a temperature above 70° C., but preferably at a temperature between 90 and 95° C. This reaction results in a precipitate; the precipitate was spectroscopically analyzed and found to be pure anhydrous thorium fluoride. The temperature range is critical, since it was found that below 70° C. a mixture of anhydrous thorium fluoride and the monohydrate, $ThF_4 \cdot H_2O$, was obtained as the final product. The preferred concentrations for the reaction were found to be a saturated solution of thorium nitrate and a hydrofluoric acid solution containing from 45 to 50% by weight of HF.

The precipitate of anhydrous thorium fluoride can be separated from the aqueous solution by means known to those skilled in the art, for instance by decantation, filtration, and centrifugation. The thorium fluoride is then advantageously washed with water and dried, preferably at about 95° C.

It will be understood that this invention is not to be limited to the details given herein but that it may be modified within the scope of the appended claim.

What is claimed is:

A process of producing anhydrous thorium fluoride comprising the step of contacting a saturated aqueous solution of thorium nitrate with an aqueous solution consisting of hydrofluoric acid and water and having a concentration of approximately 45 to 50% by weight of hydrogen fluoride at a temperature above 70° C. whereby anhydrous thorium fluoride precipitates.

References Cited in the file of this patent

UNITED STATES PATENTS

| | | |
|---|---|---|
| 1,307,153 | Ryan | June 17, 1919 |
| 2,546,933 | Steahly et al. | Mar. 27, 1951 |